United States Patent
Shibuya et al.

(10) Patent No.: US 10,116,130 B2
(45) Date of Patent: Oct. 30, 2018

(54) DISTRIBUTION BOARD, POWER CONSUMPTION MANAGING SYSTEM, AND METHODS FOR MANUFACTURING DISTRIBUTION BOARD AND POWER CONSUMPTION MANAGING SYSTEM

(71) Applicant: NEC Corporation, Minato-ku, Tokyo (JP)

(72) Inventors: Tenda Shibuya, Tokyo (JP); Syunsuke Tsuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 726 days.

(21) Appl. No.: 14/423,745

(22) PCT Filed: Aug. 30, 2013

(86) PCT No.: PCT/JP2013/073352
§ 371 (c)(1),
(2) Date: Feb. 25, 2015

(87) PCT Pub. No.: WO2014/034861
PCT Pub. Date: Mar. 6, 2014

(65) Prior Publication Data
US 2015/0207309 A1 Jul. 23, 2015

(30) Foreign Application Priority Data

Aug. 31, 2012 (JP) .................. 2012-191650

(51) Int. Cl.
*H02H 3/08* (2006.01)
*H02H 3/087* (2006.01)
*H02H 3/093* (2006.01)
*H02H 7/18* (2006.01)
*H02B 1/04* (2006.01)
*H02B 3/00* (2006.01)

(52) U.S. Cl.
CPC ................. *H02H 3/08* (2013.01); *H02B 1/04* (2013.01); *H02B 3/00* (2013.01); *Y10T 29/49117* (2015.01)

(58) Field of Classification Search
CPC ........... H02H 3/08; H02H 3/087; H02H 3/093
USPC .................................. 361/87, 93.1
See application file for complete search history.

(56) References Cited

FOREIGN PATENT DOCUMENTS

| CN | 101442190 A | 5/2009 |
|---|---|---|
| CN | 101521357 A | 9/2009 |
| EP | 1952292 A2 | 8/2008 |
| JP | H09-019009 A | 1/1997 |
| JP | 2003219518 A | 7/2003 |

(Continued)

OTHER PUBLICATIONS

Shiokawa, KR-2009-0028786; Figures 1 to 10: Entire specification. *

(Continued)

*Primary Examiner* — Dharti Patel (57) ABSTRACT

A distribution board includes: a main bar that is connected to a power supply line; a branch bar that is branched from the main bar, the branch bar supplying power to a load; a breaker that is electrically connected to the branch bar, the breaker being configured to be electrically connected to the load, the breaker limiting to a predetermined set value a current to be supplied to the load; and a display unit that is provided to the branched bar or the breaker, the display unit having a display for specifying a load that is planned to be connected to the breaker.

9 Claims, 9 Drawing Sheets

(56) References Cited

FOREIGN PATENT DOCUMENTS

| | | | |
|---|---|---|---|
| JP | 2004085413 | A | 3/2004 |
| JP | 2006345644 | A | 12/2006 |
| JP | 2010096777 | A | 4/2010 |
| JP | 2010130735 | A | 6/2010 |
| KR | 10-2009-0028786 | A | 3/2009 |
| KR | 10-1120953 | B1 | 3/2012 |

OTHER PUBLICATIONS

International Search Report for PCT Application No. PCT/JP2013/073352, dated Oct. 8, 2013.
Korean Office Action for KR Application No. 10-2015-7005047 dated Jul. 22, 2016 with English Translation.
Japanese Office Action for JP Application No. 2014-533113 dated Sep. 15, 2015 with English Translation.
Chinese Office Action for CN Application No. 2013800444881 dated Nov. 30, 2015 with English Translation.

\* cited by examiner

FIG. 10 ers, a plurality of lead-through type or clamp
DISTRIBUTION BOARD, POWER CONSUMPTION MANAGING SYSTEM, AND METHODS FOR MANUFACTURING DISTRIBUTION BOARD AND POWER CONSUMPTION MANAGING SYSTEM This application is a National Stage Entry of PCT/JP2013/073352 filed on Aug. 30, 2013, which claims priority from Japanese Patent Application 2012-191650 filed on Aug. 31, 2012, the contents of all of which are incorporated herein by reference, in their entirety.

TECHNICAL FIELD

The present invention relates to a distribution board, a power consumption managing system, and methods for manufacturing them.

BACKGROUND ART

Heretofore, a distribution board with sensors including a function of measuring current or power is known. Such a distribution board includes a main breaker, a plurality of main bars (or main plates, omitted hereunder) and branch bars (or branch plates, omitted hereunder), a plurality of branch breakers, a plurality of lead-through type or clamp type current sensors, a plurality of signal transmission paths, a plurality of input signal ports, and a signal processing unit. The plurality of main bars are connected to a load side terminal of the main breaker. The plurality of branch bars extend from the main bars. The plurality of branch breakers are connected to the plurality of branch bars. The branch bars join the branch breakers and the main bars. The current sensors are installed with respect to electrical wires connected to loads on the branch bars or the load side terminals of the main breaker. The plurality of signal transmission paths transmit detection signals output from the current sensors. The plurality of input signal ports fetch the detection signals transmitted from the signal transmission paths. The signal processing unit processes the detection signals fetched by the plurality of input signal ports.

PRIOR ART DOCUMENTS

Patent Document

[Patent Document 1] Japanese Unexamined Patent Application, First Publication No. 2010-130735

SUMMARY OF THE INVENTION

Problem to be Solved by the Invention

In the above-described distribution board, it is not possible to automatically specify to which branch breaker each of the plurality of current sensors is connected, and to which input signal port it is connected. As a result, it is necessary to initialize a correspondence relationship between a desired branch breaker, current sensor, and input signal port with respect to the signal processing unit manually or using correspondence definition data or the like created manually in advance. Furthermore, it is essential to clarify the meaning of, or to coordinate, individual measurement data, as measurement results of the sensor units. As a result, it requires work involving a great deal of labor when installing the distribution board.

This invention has been made in consideration of the above circumstances. An exemplary object of the present invention is to provide a distribution board that is easy to install, a power consumption managing system, and methods for manufacturing them.

Means for Solving the Problem

A distribution board according to an exemplary aspect of the present invention includes: a main bar that is connected to a power supply line; a branch bar that is branched from the main bar, the branch bar supplying power to a load; a breaker that is electrically connected to the branch bar, the breaker being configured to be electrically connected to the load, the breaker limiting to a predetermined set value a current to be supplied to the load; and a display unit that is provided to the branched bar or the breaker, the display unit having a display for specifying a load that is planned to be connected to the breaker.

The distribution board according to the exemplary aspect of the present invention may further include a sensor unit that measures current supplied from the main bar to the load. The sensor unit may include: a sensor element that is installed on part of a wire supplying power from the main bar to the load, the sensor element emitting a signal corresponding to magnitude of current in the wire; a storage unit that stores identification information for specifying the sensor element and operating characteristics information indicating operating characteristics of the sensor element; and an output unit that is electrically connected with the sensor element and the storage unit, the output unit outputting a power consumption pattern of the load based on the signal from the sensor element, the identification information, and the operating characteristics information.

A method according to an exemplary aspect of the present invention for manufacturing the above-described distribution board includes: providing to the breaker, a display for specifying a load that is planned to be connected to the breaker, and connecting the load specified by the display to the breaker after the main bar, the branch bar, the breaker, and the sensor unit are assembled.

A power consumption managing system according an exemplary aspect of the present invention includes: the above-described distribution board; and a control device that is electrically connected to the output unit. The control device includes: a data base that stores the loads and the identification information with they being corresponding to each other; and a monitor unit that receives the power consumption pattern of the load output by the output unit, the identification information, and the operating characteristics information, the monitor unit referencing the data base after the reception, the monitor unit monitoring the power consumption pattern of the load connected to the distribution board.

A method according to an exemplary aspect of the present invention for manufacturing the above-described power consumption managing system includes: providing to the breaker, a display for specifying a load that is planned to be connected to the breaker; and connecting the load specified by the display to the breaker after the main bar, the branch bar, the breaker, and the sensor unit are assembled.

Effect of the Invention

According to the present invention, an operator who installs the distribution board can determine easily which load is to be connected to which breaker by using the display in the display unit. As a result, the work at the time of installation is easy.

EMBODIMENTS FOR CARRYING OUT THE INVENTION

A distribution board and a power consumption managing system according to an exemplary embodiment of the present invention will be described with reference to the drawings.

Figure 1:
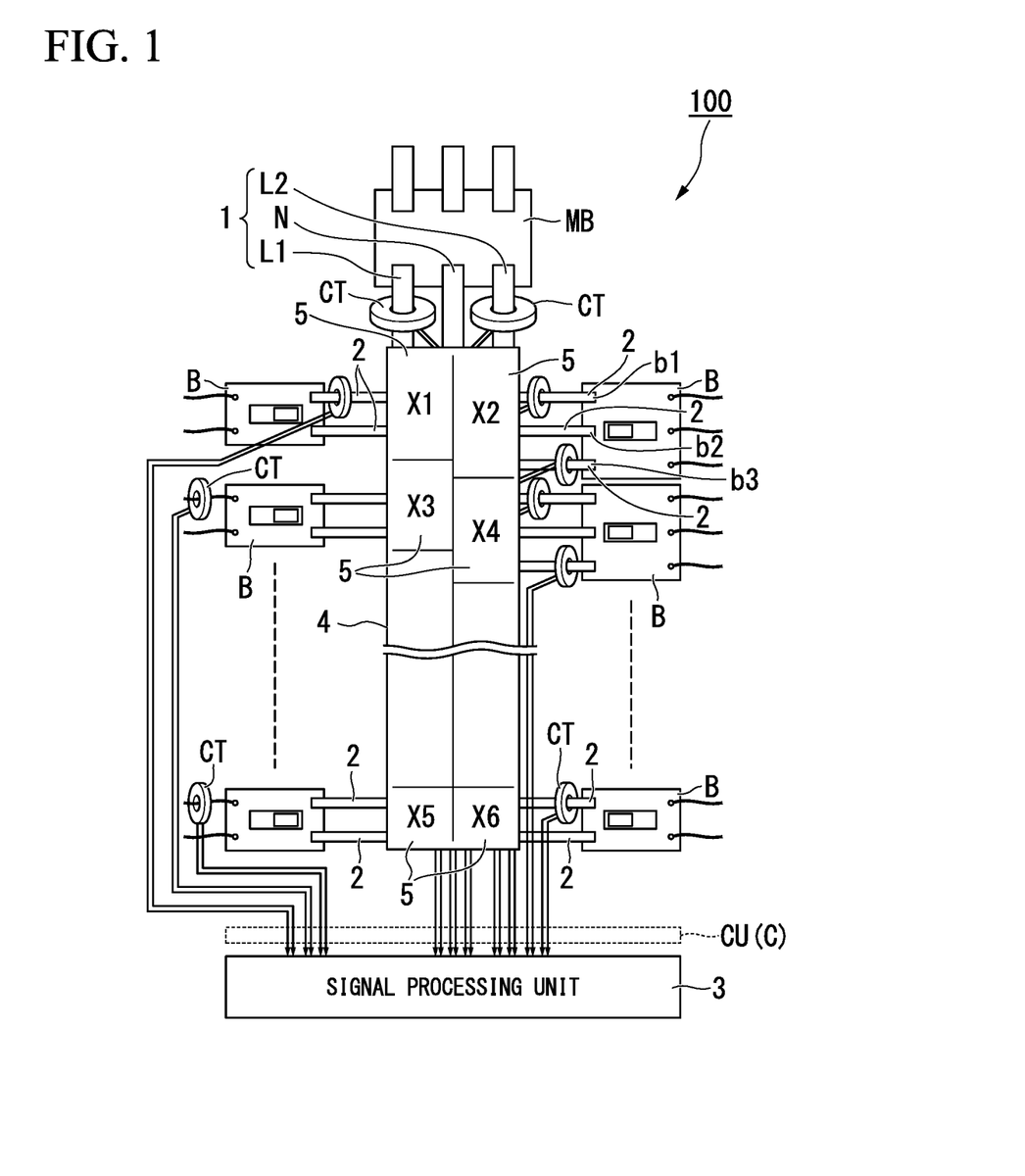
FIG. 1 is a configuration diagram showing an example of a distribution board according to an exemplary embodiment of the present invention.
Figure 2:
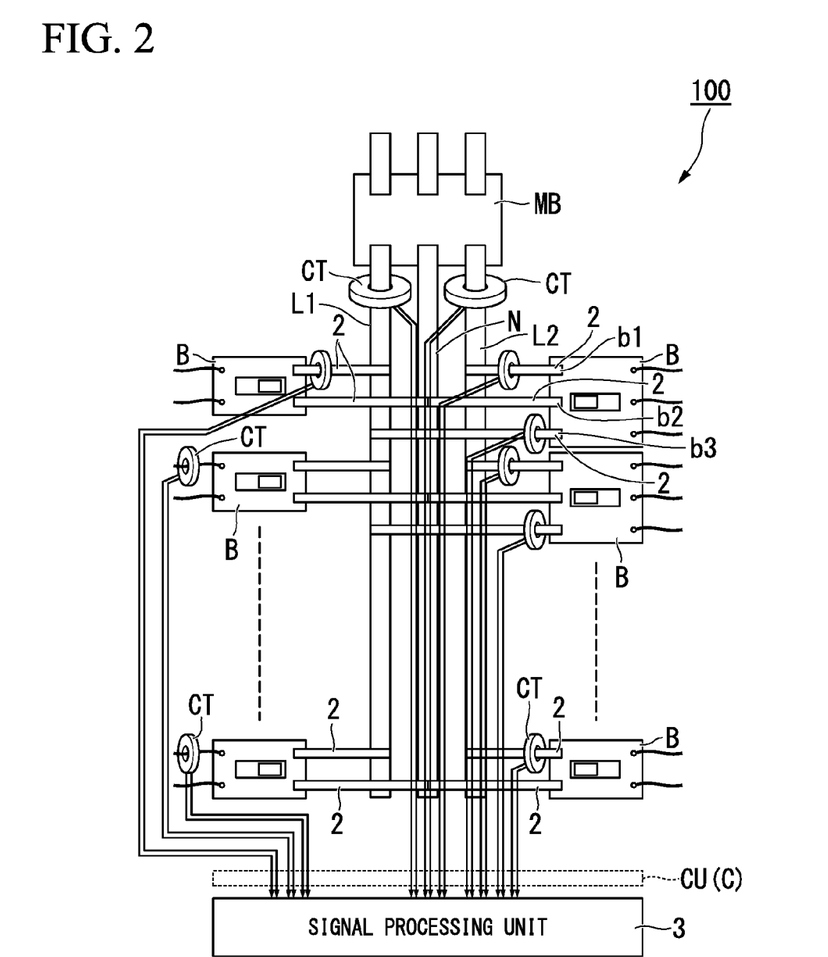
FIG. 2 is a configuration diagram showing the distribution board shown in FIG. 1.
Figure 3:
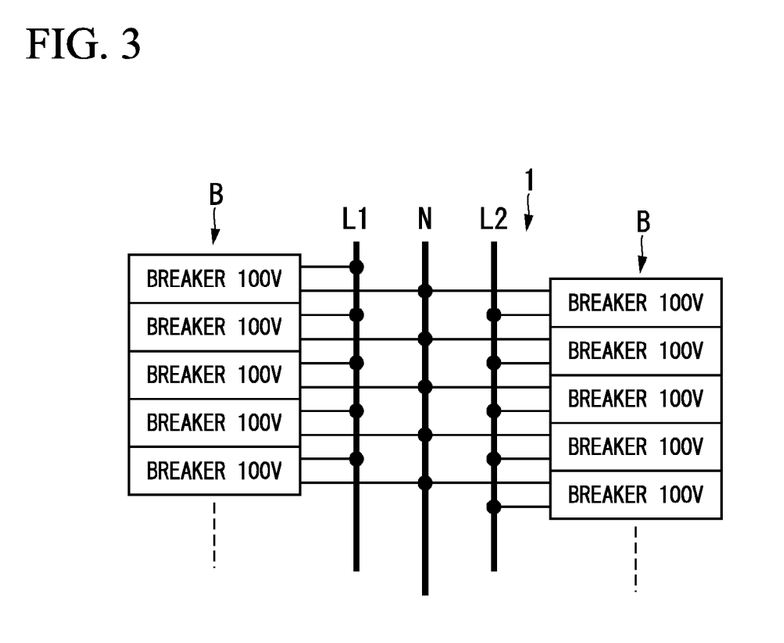
FIG. 3 is a circuit diagram showing a layout of current sensors, breakers, sensor units, a selection line driving circuit, and an identification circuit, in the exemplary embodiment of the present invention.

FIG. 1 is a configuration diagram showing an example of a distribution board and a power consumption managing system of the present exemplary embodiment. FIG. 2 is a configuration diagram of the distribution board and the power consumption managing system shown in FIG. 1. In FIG. 2, illustration of a display unit is omitted. FIG. 3 is a circuit diagram showing, schematically, the configuration of the distribution board and the power consumption managing system of the present exemplary embodiment.

Figure 7:
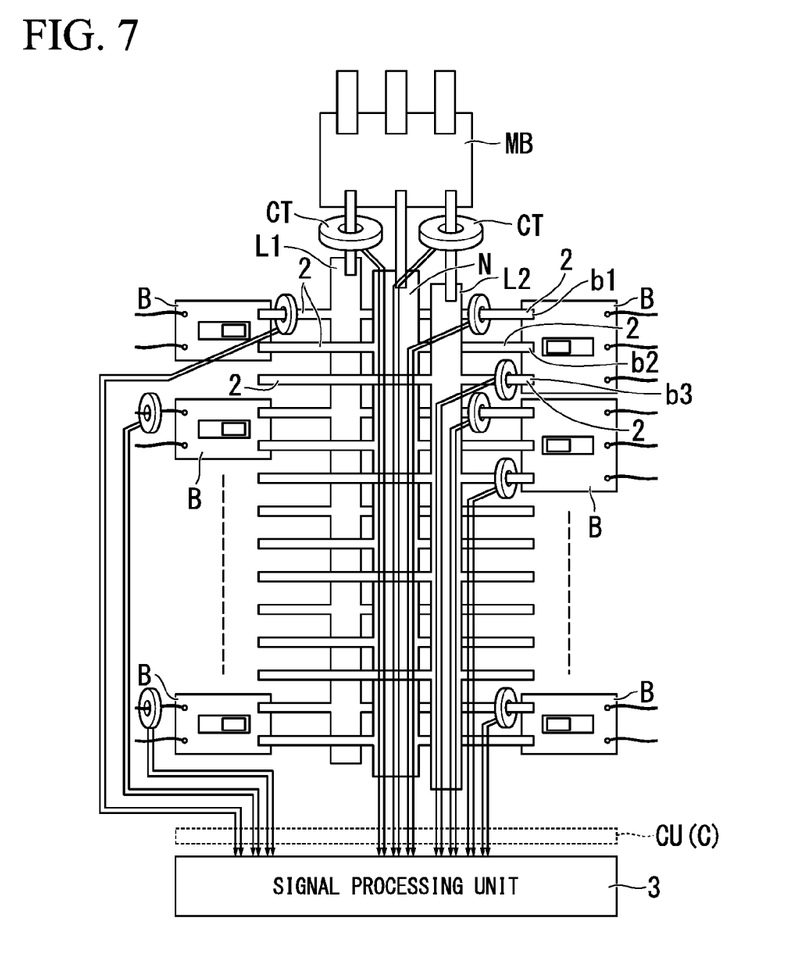
FIG. 7 is a configuration diagram showing another example of a distribution board having a sensor that includes a function for measuring current or power, in the exemplary embodiment of the present invention.

As shown in FIG. 1 and FIG. 2, a distribution board 100 may be a single phase three wire distribution board. The distribution board 100 includes a main breaker MB, a main bar 1, a branch bar 2, branch breakers B, a signal processing unit 3, and a charging unit cover 4. The main bar 1 contains a plate shaped main plate (refer to FIG. 7). The branch bar 2 contains a plate shaped branch plate (refer to FIG. 7).

The main bar 1 is made from a rod shaped or a plate shaped conductor. The main bar 1 is constituted from a charging part L1 of an L1 pole, a receiving part N of an N pole, and a charging part L2 of an L2 pole. Devices serving as loads are electrically connected to two among the charging part L1, the charging part N, and the charging part L (the charging parts L1 and N, the charging parts L2 and N, or the charging parts L1 and L2). By so doing, the devices can receive for example single phase 100V or single phase 200V power supply. In the present exemplary embodiment, the main bar 1 is made of copper.

A plurality of branch bars 2 are formed at the ends of the charging parts L1, L2, and N on the main bar 1 in a many legged form such that they protrude. The branch bars 2 are arranged such that they engage with a plurality of concave parts b1, b2, and b3 contained in a plurality of branch breakers B. FIG. 3 schematically shows a circuit equivalent to this connection state.

The branch breakers B are fitted and electrically connected with the branch bars 2 of two respective charging parts among the three charging parts L1, L2, and N of the main bar 1. Two charging parts among the three charging parts L1, L2, and N means the charging parts L1 and N, or the receiving parts L2 and N, for example. The branch breakers B limit the current supplied to the loads, being electrical equipment connected to power, to predetermined set values.

A current sensor CT (sensor element) is installed on the branch bar 2. The current sensor CT has a core 10 and a secondary coil 11. The core 10 has a ring shape. An induced current is generated in the core 10 by current supplied from the main bar 1. The secondary coil 11 is a wire thread, and is coiled around the core 10. The secondary coil 11 detects the induced current generated in the core 10.

The current sensor CT forms part of a signal processing unit 3, which is described later. By inserting the ring core 10 on the branch bar 2, it is possible to install the current sensor CT on the branch bar 2. Cores 10 may be arranged such that one core 10 is located alternate with another adjacent core 10 by shifting the locations at which the cores 10 are installed on the branch bars 2 in the longitudinal direction of the branch bars 2 such that adjacent ring cores 10 do not make contact with each other.

Figure 4:
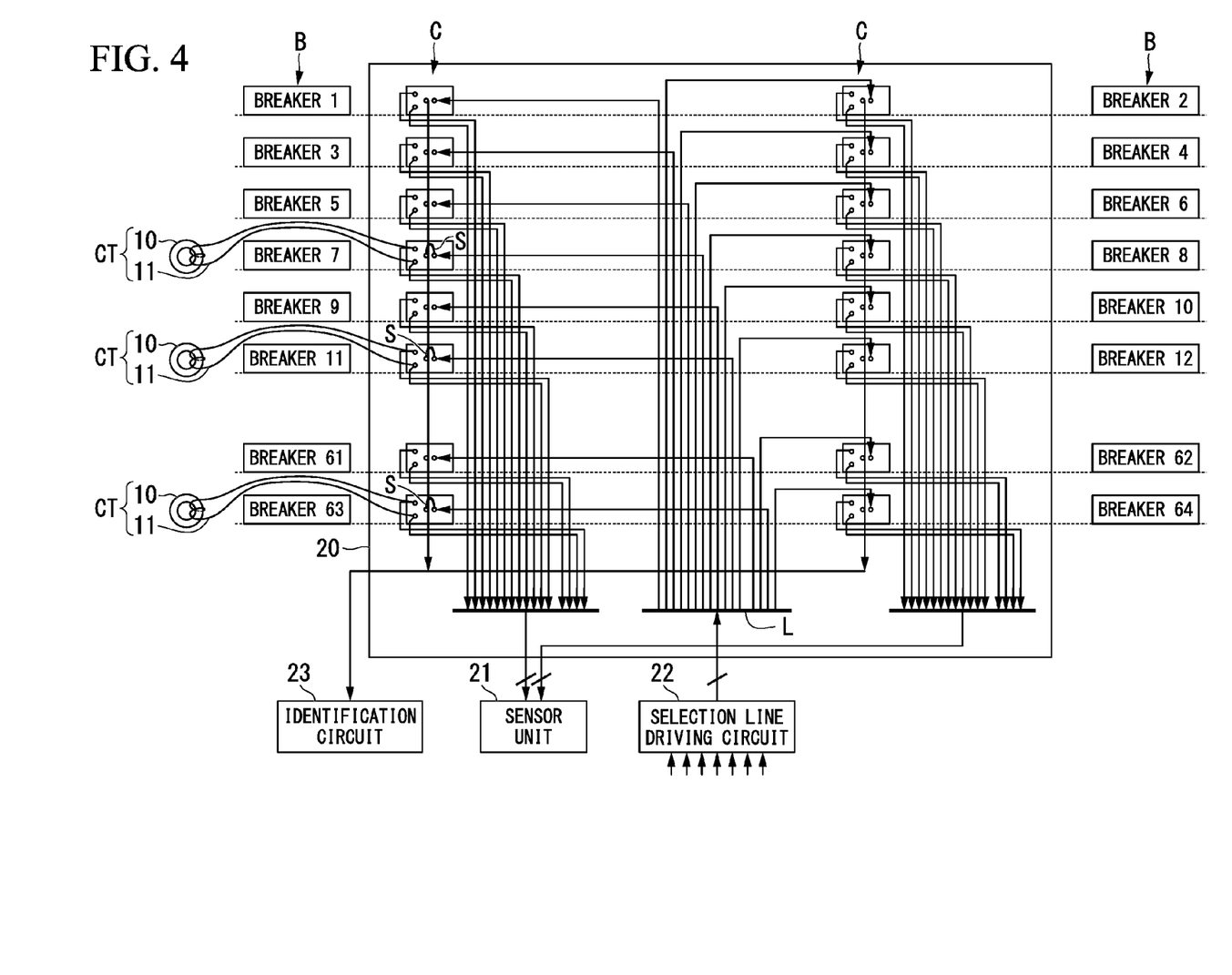
FIG. 4 is a circuit diagram to explain a sense voltage (Vs) detected in a sensor unit.
Figure 5:
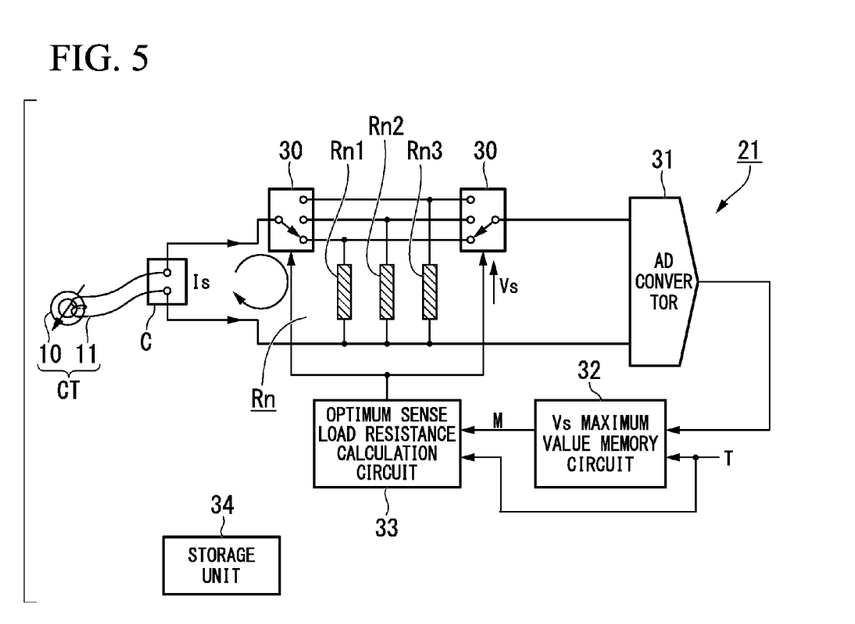
FIG. 5 is a circuit diagram showing FIG. 4 in detail, in the exemplary embodiment of the present invention.

FIG. 4 is a circuit diagram to explain a sense voltage (Vs) detected by the sensor unit 21. FIG. 5 is a circuit diagram showing FIG. 4 in detail.

As shown in FIG. 4, terminal portions of the secondary coil 11 made of wires are connected to two terminals of the connector C. The two terminals of the connector C are connected to the sensor unit 21 through the wiring on a substrate 20. Furthermore, the sensor unit 21, a selection line driving circuit 22, and an identification circuit 23 are connected to the substrate 20.

The connector C is constituted by four terminals. In the case where the wires of the secondary coil 11 of the current sensor CT are connected to two terminals among the four terminals, a current detection signal of the current sensor CT is supplied to the sensor unit 21 through the two terminals. Moreover, in the case where the current sensor CT is connected to two terminals among the four terminals, a short wire S is provided on the remaining two terminals, forming a conduction path between the two terminals.

The connector C is constituted from a transmission connector and a reception connector. By the transmission connector and the reception connector being joined, the current sensor CT is connected to the lines on the substrate 20. However, in the figure, only one connector is shown for convenience.

In the case where the sensor unit CT and the short wire S are provided on the four terminals of the connector C, the identification circuit 23 outputs a signal of "sensor unit CT exists (high: H)" indicating the existence of the sensor unit CT. Furthermore, the sensor unit 21 fetches a current detection signal from the sensor unit CT. Moreover, the selection line driving circuit 22 selects a line L that can be used for a load (electrical equipment) among the lines L that are identified in the identification circuit 23 as "sensor unit CT exists (high)", and enables power supply through the breaker B of the line L.

In the case where the sensor unit CT and short wire S are not provided on the four terminals of the connector C, the identification circuit 23 outputs a signal of "no sensor unit CT (low: L)" indicating that no sensor unit CT exists. Furthermore, the sensor unit 21 cannot fetch a current detection signal from the sensor unit CT. Moreover, the selection line driving circuit 22 does not select a line L that is identified as "no sensor unit CT (low)" in the identification circuit 23 as a line L that can be used for a load (electrical equipment).

As shown in FIG. 1, the arrangement may be such that each of the current sensors CT and the substrate 20 are connected by a connector unit CU including a plurality of connectors C. In this case, since the plurality of current sensors CT can be attached or removed in the sensor unit 21 in one operation, work efficiency is good.

The charging unit cover 4 is a member that covers part of the main bar 1 and the branch bars 2. The charging unit cover 4 has a display unit 5 in which displays X1, X2, . . . , X6 are provided. Displays X1, X2, . . . , X6 (sometimes denoted hereunder as "display X" in general terms) indicate the designations of loads to be connected to the branch breakers B. The display unit 5 is provided on the distribution board 100 in a state in which the positional relationship between the display unit 5 and the branch breakers B is fixed. Therefore the correspondence between the branch breakers B and the displays X is evident.

Next is a description of the configuration of the sensor unit 21.

As shown in FIG. 4, the sensor unit 21 calculates a load current ($I_L$) flowing through the main bar 1 or the branch bar 2 by measuring the sense voltage (Vs). The sense voltage (Vs) is determined based on a value of a secondary current (Is) supplied through the secondary coil 11. That is, the sense voltage (Vs) is expressed as the multiplication of the secondary current (Is) and sense load resistance (Rs). The relationship between the sense voltage (Vs), the secondary current (Is), the sense load resistance (Rs), and the load current (IL) is expressed in the following equation. In the following equation, "K" denotes a coupling coefficient, and "N" denotes the number of turns on the secondary coil.

$$Vs\text{:SENSE VOLTAGE} = Is\text{:SECONDARY CURRENT} \times Rs\text{:SENSE LOAD RESISTANCE}$$

$$= K\text{:COUPLING COEFFICIENT} \times \frac{I_L\text{:LOAD CURRENT}}{N\text{:NUMBER OF TURNS ON SECONDARY COIL}} \times Rs\text{:SENSE LOAD RESISTANCE}$$

[Equation 1]

As shown in the above equation, by measuring the sense voltage (Vs), it is possible to calculate the load current ($I_L$) flowing through the main bar 1 or the branch bar 2.

Next is a description of a specific circuit structure in the sensor unit 21 for adjusting the sense voltage (Vs) represented by the above equation to an optimal value.

The sensor unit 21 shown in FIG. 5 is provided with a signal processing circuit including a resistor switching unit (resistive circuit) 30 which switches between the resistors Rn (Rn1 to Rn3), an AD convertor 31, a Vs maximum value memory circuit (referred to hereunder simply as memory circuit) 32, an optimum sense load resistance calculation circuit (resistive circuit, referred to hereunder simply as calculation circuit) 33, and a storage unit 34.

The resistance Rs1 of resistor Rn1 is 10Ω. The resistance Rs2 of resistor Rn2 is 100Ω. The resistance Rs3 of resistor Rn3 is 1000Ω. The resistances Rs1 to Rs3 of resistors Rn1 to Rn3 are examples, and modification of the settings is possible. Furthermore, the types of the resistors (resistances) may be increased appropriately according to the conditions.

In this sensor unit 21, in the resistor switching unit 30, the sense load resistance (Rs) is set to "resistance Rs1 (=10Ω)" as an initial step, for example.

The storage unit 34 stores identification information for identifying a current sensor CT to be connected with the sensor unit 21, and operating characteristics information for indicating performance characteristics of the current sensor CT. In the present exemplary embodiment, the identification information of a current sensor CT includes information for specifying a load to be connected to a branch breaker B, being an object where the current sensor CT is installed. As a result, by reading the identification information stored in the storage unit 34, it is possible to recognize to which load the sensor unit 21 in which the storage unit 34 is provided corresponds.

The sense voltage (Vs), being a current measurement value, is firstly converted to a digital value in the AD convertor 31, and measured in a voltage measurement unit in the sensor unit 21 (not shown in the figure). The sense voltage (Vs) output from the AD convertor 31 is output to the memory circuit 32. This memory circuit 32 stores the value of the sense voltage (Vs) input from the AD convertor 31 for a certain period of time set in advance (for example, one day, one hour). To the memory circuit 32 and the calculation circuit 33 there is input a signal T that sets the certain period of time (prescribed time). Moreover, the memory circuit 32 stores a maximum value M (maximum value during the prescribed time) of the sense voltage (Vs) for the certain period of time.

The maximum value M of the sense voltage (Vs) stored in the memory circuit 32 is output to the calculation circuit 33. The calculation circuit 33 selects an optimal sense load resistance (Rs) based on the maximum value M.

To be specific, the calculation circuit 33 switches the analog switch (SW) of the resistor switching unit 30 such that the sense voltage (Vs) becomes an optimal value set in advance or a value close to it based on the maximum value M of the sense voltage (Vs) stored in the memory circuit 32, and changes the sense load resistance (Rs).

By such a switching operation of the resistor switching unit 30 by the calculation circuit 33, it is possible to dynamically switch the sense load resistance (Rs) to the most appropriate value of the input range (sensitivity, dynamic range).

Instead of the method in which a plurality of fixed sense loads are connected selectively to switch the input range, a method may be used in which the input range is adjusted using a variable resistor.

In the power consumption managing system as described above, in the case where the sensor unit CT and the short wire S are installed on four terminals of the connector C, a signal of "sensor unit CT exists (high)" indicating the existence of the sensor unit CT is output from the identification circuit 23. Moreover, the sensor unit 21 fetches a current detection signal from the sensor unit CT. Furthermore, the selection line driving circuit 22 selects a line L that can be used for a load (electrical equipment) among the lines L that are identified as "sensor unit CT exists (high)" in the identification circuit 23, which enables power supply through the breaker B of the line L.

Moreover, the sensor unit 21 measures the sense voltage (Vs) based on the fetched secondary current (Is) and the sense load resistance (Rs) set in advance in the resistance switching unit 30. Afterwards, the sense voltage (Vs) is stored in the memory circuit 32 for a certain period of time (for example, one day, one hour) set in advance, and the maximum value M during the period is stored. After that, the maximum value M of the sense voltage (Vs) stored in the memory circuit 32 is output to the calculation circuit 33. The calculation circuit 33 switches the resistance switching unit 30 such that the sense voltage (Vs) becomes an optimal value set in advance, based on the maximum value M of the sense voltage (Vs), to change the sense load resistances (Rs1 to Rs3). By so doing, the sense load resistance (Rs) is adjusted to the most appropriate value of the input range (sensitivity, dynamic range).

Next is a description of a method for manufacturing the distribution board 100.

The distribution board 100 is conveyed to an installation location after at least a main bar 1 on which branch bars 2 are formed, a main breaker MB, a signal processing unit 3, a charging unit cover 4 having display units 5, and current sensors CT are assembled. In a case where connectors C are provided individually for each of the current sensors CT, then before conveying to the installation location, the current sensors CT and the sensor unit 21 are connected via the connectors C. In a case where a connector unit CU is used, it need not be connected to the current sensors CT via the connector unit CU at this stage.

Afterwards, at the installation location, according to a display X in the display unit 5, a load specified by the display X is connected to a branch breaker B. In the case where a connection unit CU is used, connection of the current sensor CT via the connector unit CU can be performed at the installation location.

According to the distribution board 100 of the present exemplary embodiment as described in detail above, since it has a display unit 5, it is possible to specify a load to be connected to a branch breaker B easily at the installation location of the distribution board 100. As a result, it is easy to perform the connection of a load to the branch breaker B.

In the present exemplary embodiment, the distribution board 100 alone having the signal processing unit 3 functions as a power consumption managing system.

Due to a connector unit CU being provided, it is possible to prevent installation errors occurring even if the current sensor 10 and the sensor unit 21 are connected at the installation location of the distribution board 100.

Since the current sensors 10 and the branch breakers B have already been assembled before they are conveyed to the installation location, it is possible to shorten the time of the field work at the installation location. Furthermore, it is possible to prevent installation errors occurring in the case where a plurality of current sensors 10 with different operation characteristics are installed on the distribution board 100.

The sensor unit 21 that measures current supplied from the main bar 1 to the breaker B includes a signal processing unit (resistance switching unit 30, AD convertor 31, memory circuit 32, calculation circuit 33). The signal processing unit receives a current detection signal detected in the current sensor CT over a predetermined time, and determines the range of the signal level from the received current detection signal. Moreover, the signal processing unit adjusts the input range of the current detection signal according to the determination result. In the signal processing unit, it is possible to adjust the input range (sensitivity, dynamic range) to the optimal value regardless of the type of the coil shaped current sensor CT for detecting a current value flowing to the breaker B. As a result, it is possible to measure the current in the current sensor CT accurately.

For example, the signal processing unit includes a resistive circuit (resistance switching unit 30, calculation circuit 33). The resistive circuit has a plurality of resistors Rn with different resistances, connected in parallel with each other. The resistors Rn are connected in series with the secondary coils 11. The resistive circuit adjusts the input range of the current detection signal to the optimum value by selecting one of the resistors Rn. Using this structure, it is possible to adjust the input range of the current detection signal to the optimal value by selecting one of the plurality of resistors Rn (Rn1 to Rn3) in the resistive circuit.

The current sensors CT are installed on the branch bars (including the branch plates) 2 that are branched from the charging units L1, L2, and N of the main bar (including the main plate) on which the branch breakers B are installed. Using this construction, it becomes easy to install the current sensors CT. As a result, it is possible to improve the work efficiency associated with the installation. At this time, if the concave part of a branch breaker B is engaged with the end of a branch bar 2 after the branch bar 2 is inserted into the hole of the core 10 of a current sensor CT, it is possible to install a detector for measuring power consumption easily by passing the branch bar 2 through the coil when it is branched from the main line (operation for engaging the branch bar 2 with the branch breaker B).

Figure 6:
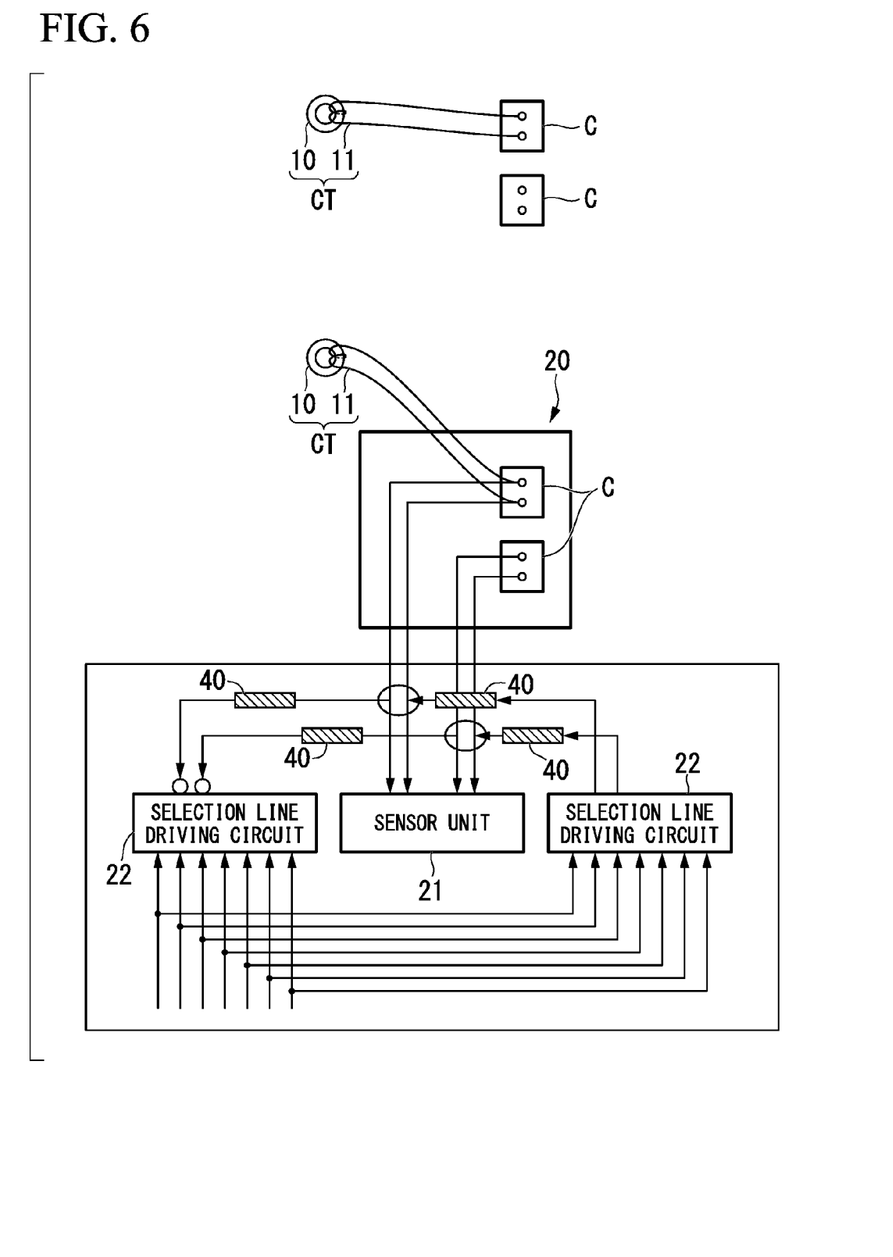
FIG. 6 is a diagram showing another embodiment of the circuit diagram shown in FIG. 2.

In the above-described exemplary embodiment, by using a connector C with four terminals and installing the short wire S on two terminals of the connector C, the existence of a sensor unit CT is detected in the identification circuit 23. However, this structure is not a limitation. As shown in FIG. 6, the arrangement may be such that using a connector C with two terminals, no short wire S is installed on the two terminals of the connector C, and detection of the sensor unit CT in the identification circuit 23 is omitted.

In FIG. 6, in the sensor unit 21, based on the current detection signal output from the sensor unit CT, power supplied from the main bar 1 to the breaker B is measured. Furthermore, the selection line driving circuit 22 flows a constant direct load current to a line having a current detection signal supplied from the current sensor CT to the sensor unit 21, via a resistive load 40 (electrical equipment). Since there is a difference in the input voltage to the sensor unit 22 between the case where the current sensor CT is connected and the case where it is not connected, it is possible to measure the current in the line.

First Modified Example

Figure 8:
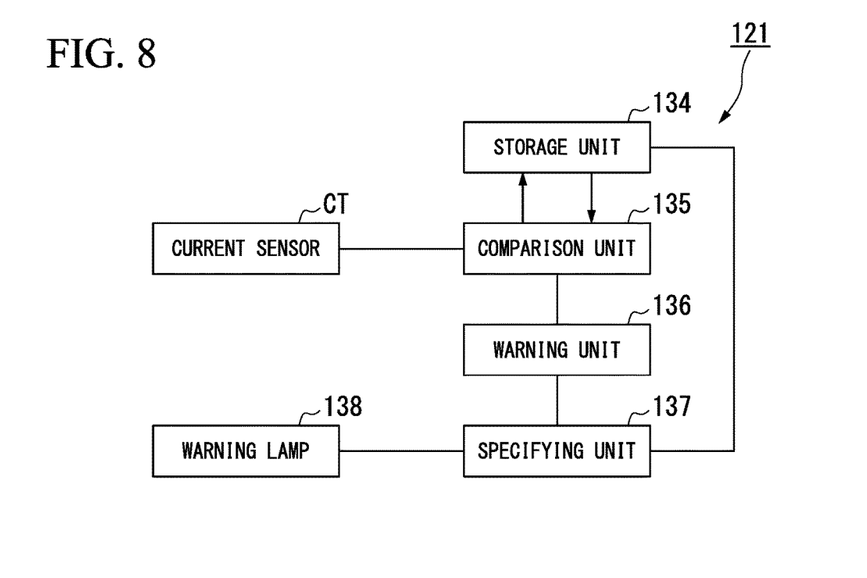
FIG. 8 is a block diagram showing the configuration of a first modified example of the present exemplary embodiment.

Next is a description of a first modified example of the above-described exemplary embodiment. FIG. 8 is a block diagram showing the configuration of the first modified example.

A distribution board of the first modified example differs from the distribution board of the above-described exemplary embodiment in the point that it has a sensor unit 121 instead of the sensor unit 21. Part of the processing content of the sensor unit 121 is different from that of the sensor unit 21.

The sensor unit 121 includes a storage unit 134 that is similar to the storage unit 34. The storage unit 134 further stores the pattern of power consumption assumed in a load to be connected to the branch breaker B.

The sensor unit 121 further includes a comparison unit 135 and a warning unit 136. The comparison unit 135 compares the assumed power consumption pattern stored in the storage unit 134 with an actual measurement value of the power consumption pattern based on a signal from the current sensor CT. The warning unit 136 references the comparison result by the comparison unit 135, and emits an attention attracting signal for attracting attention in the case where the actual measurement value differs from the assumed power consumption pattern by greater than or equal to a predetermined discrepancy.

The warning unit 136 is connected to a specifying unit 137. The specifying unit 137 specifies the current sensor CT associated with the attention attracting signal in the vicinity of each of the displays X in the display unit 5, for example, based on identification information stored in the storage unit 134.

The display unit 5 is provided with warning lamps (indication units) 138 whose operations are controlled by the specifying unit 137. Each warning lamp 138 is disposed in the vicinity of a respective display X.

In the first modified example, at the time of operating the distribution board 100, in a case where the sensor unit 121 detects that a load actually connected to the branch breaker B is different from a load originally to be connected to the branch breaker B, the current sensor CT is specified by the specifying unit 137, and a warning lamp 138 corresponding to this current sensor CT is lit. By so doing, it is possible to warn a user that the connection of the load is in error.

Second Modified Example

Figure 9:
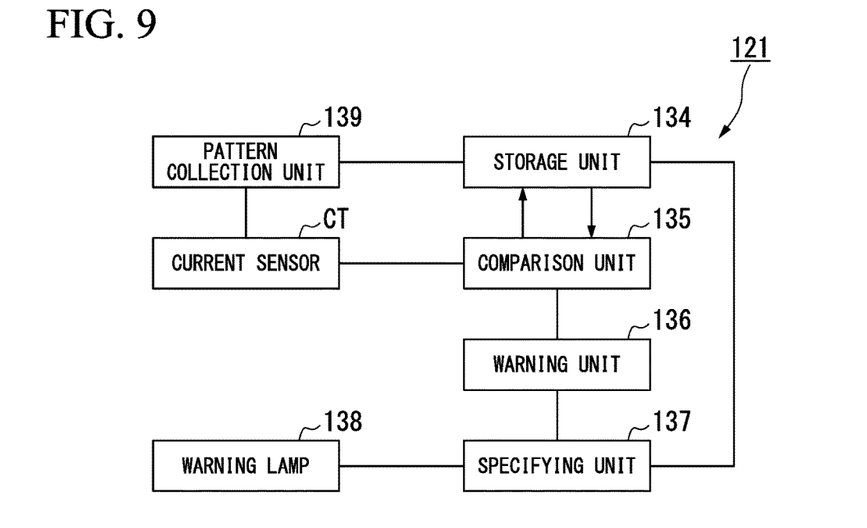
FIG. 9 is a block diagram showing the configuration of a second modified example of the present exemplary embodiment.
Figure 10:
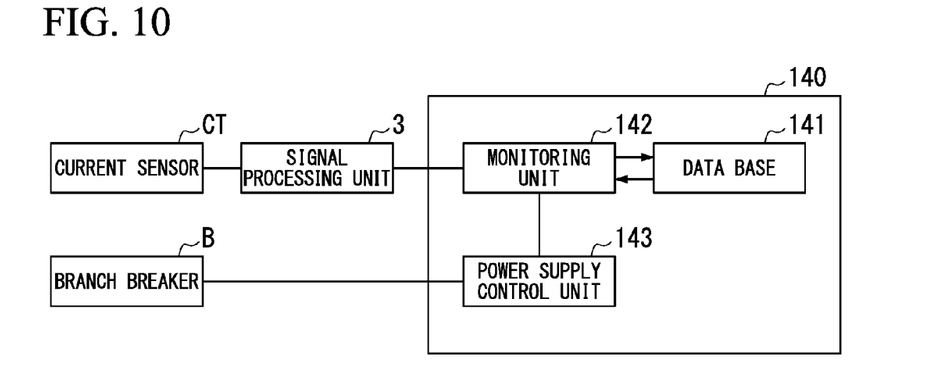
FIG. 10 is a block diagram showing the configuration of a third modified example of the present exemplary embodiment.

Next is a description of another modified example of the above-described exemplary embodiment. FIG. 9 is a block diagram showing the configuration of a second modified example.

A sensor unit 121 of the second modified example differs from the sensor unit 121 of the first modified example in the point that it further includes a pattern collection unit 139.

The pattern collection unit 139 collects power consumption patterns obtained from each of the current sensors CT from when the operation of the distribution board 100 starts until a predetermined period has elapsed. The pattern collection unit 139 obtains a reference pattern based on the collected power consumption pattern.

Furthermore, the content that is stored in the storage unit 134 in the second modified example differs from what is stored in the storage unit 134 in the first modified example. That is, in the first modified example, the storage unit 134 (refer to FIG. 8) stores an assumed power consumption pattern. Instead of this, in the second modified example, the storage unit 134 stores a reference pattern.

The comparison unit 135 compares the reference pattern stored in the storage unit 134 and an actual measurement value of the power consumption pattern based on the signal from the current sensor CT after collection. The warning unit 136 references the comparison result by the comparison unit 135, and emits an attention attracting signal for attracting attention in the case where the actual measurement value differs from the reference pattern by greater than or equal to a predetermined discrepancy.

With such a construction, in a case where an incorrect load is connected to a branch breaker B by a maintenance work error after the distribution board 100 is installed, it is possible to detect it and warn of the error.

Third Modified Example

Next is a description of a third modified example of the above-described exemplary embodiment. FIG. 9 is a block diagram showing the configuration of the third modified example.

As shown in FIG. 9, in the third modified example, a remote control device 140 is connected to the signal processing unit 3.

The remote control device 140 includes a data base 141, a monitoring unit 142, and a power supply control unit 143. The data base 141 stores the designations, ratings, and assumed power consumption patterns of loads with they being corresponding to the identification information of the current sensor CT. The monitoring unit 142 receives an actual measurement value of the power consumption pattern from the current sensor CT, and monitors the power consumption pattern of the load while referencing the data base 141. The power supply control unit 143 controls the charge state of the branch breaker B. In the third modified example, the power consumption managing system is constituted by the distribution board 100 having a signal processing unit 3, and the remote control device 140.

In the third modified example, it is possible to monitor the power consumption pattern of a load. For example, in a case where the power consumption pattern of a load differs from an assumed power consumption pattern, the power supply control unit 143 can actuate the branch breaker B to stop the power supply to the load.

The remote control device 140 does not need to be located at the installation location of the distribution board 100. As a result, it is possible to control the distribution board 100 even in a location different from the installation location of the distribution board 100.

As above, the exemplary embodiment of the present invention is described in detail with reference to the drawings. However, specific configurations are not limited to the exemplary embodiment. Any design change or the like that does not depart from the scope of the present invention is also included.

For example, it is also possible to use a Hall element instead of a current transformer as a current sensor.

Parts or the whole of the above-described exemplary embodiment can also be described by the following supplementary notes. However, the following are not limiting.

(Supplementary note 1) A distribution board including:
a main bar that is connected to a power supply line;
a branch bar that is branched from the main bar, the branch bar supplying power to a load;
a breaker that is electrically connected to the branch bar, the breaker being configured to be electrically connected to the load, the breaker limiting to a predetermined set value a current to be supplied to the load; and
a display unit that is provided to the branched bar or the breaker, the display unit having a display for specifying a load that is planned to be connected to the breaker.

(Supplementary note 2) The distribution board according to supplementary note 1, further including:
a sensor unit that measures current supplied from the main bar to the load,
wherein the sensor unit includes:

a sensor element that is installed on part of a wire supplying power from the main bar to the load, the sensor element emitting a signal corresponding to magnitude of current in the wire;

a storage unit that stores identification information for specifying the sensor element and operating characteristics information indicating operating characteristics of the sensor element; and an output unit that is electrically connected with the sensor element and the storage unit, the output unit outputting a power consumption pattern of the load based on the signal from the sensor element, the identification information, and the operating characteristics information.

(Supplementary note 3) The distribution board according to supplementary note 2, wherein the storage unit stores in advance an assumed power consumption pattern indicating a power consumption pattern assumed when the load connected to the wire is being operated, and the sensor unit further includes:

a comparison unit that compares the assumed power consumption pattern stored in the storage unit and an actual measurement value of the power consumption pattern based on the signal; and a warning unit that references a comparison result by the comparison unit, the warning unit emitting a signal for attracting attention when the warning unit determines that the actual measurement value differs from the assumed power consumption pattern by greater than or equal to a predetermined discrepancy.

(Supplementary note 4) The distribution board according to supplementary note 2, wherein the sensor unit further includes:

a pattern collection unit that collects an actual measurement value of a power consumption pattern when the load connected to the wire is being operated, the pattern collection unit obtaining a reference pattern based on the collected actual measurement value;

a comparison unit that compares the actual measurement value of the power consumption pattern based on the signal emitted from the sensor element after collection, with the reference pattern; and a warning unit that references a comparison result by the comparison unit, the warning unit emitting a signal for attracting attention when the warning unit determines that the actual measurement value after the collection differs from the reference pattern by greater than or equal to a predetermined discrepancy.

(Supplementary note 5) The distribution board according to supplementary note 3 or 4, further including:

a plurality of branch bars that includes the branch bar;

a plurality of breakers that includes the breaker; and a plurality of sensor elements that including the sensor element, wherein the sensor unit further includes:

a specifying unit that specifies a sensor element associated with the signal for attracting attention using the identification information; and an indication unit that indicates to a user the sensor element specified by the specifying unit, or the branch bar or the breaker corresponding to the specified sensor element.

(Supplementary note 6) A method for manufacturing the distribution board according to any one of supplementary notes 2 to 5, the method including:

providing to the breaker, a display for specifying a load that is planned to be connected to the breaker, and connecting the load specified by the display to the breaker after the main bar, the branch bar, the breaker, and the sensor unit are assembled.

(Supplementary note 7) A power consumption managing system including:

the distribution board according to any one of supplementary notes 2 to 5; and a control device that is electrically connected to the output unit, wherein the control device includes:

a data base that stores the loads and the identification information with they being corresponding to each other; and a monitor unit that receives the power consumption pattern of the load output by the output unit, the identification information, and the operating characteristics information, the monitor unit referencing the data base after the reception, the monitor unit monitoring the power consumption pattern of the load connected to the distribution board.

(Supplementary note 8) The power consumption managing system according to supplementary note 7, wherein the control device includes a power supply control unit that outputs a control signal to the breaker to control power supply, and the breaker changes starting and stopping of current supply to the load based on the control signal.

(Supplementary note 9) A method for manufacturing the power consumption managing system according to supplementary note 7 or 8, the method including:

providing to the breaker, a display for specifying a load that is planned to be connected to the breaker; and connecting the load specified by the display to the breaker after the main bar, the branch bar, the breaker, and the sensor unit are assembled.

This application is based upon and claims the benefit of priority from Japanese patent application No. 2012-191650, filed on Aug. 31, 2012, the disclosure of which is incorporated herein in its entirety by reference.

INDUSTRIAL APPLICABILITY

The present invention relates to a distribution board, a power consumption managing system, and methods for manufacturing them.

REFERENCE SYMBOLS

1 Main bar (or Main plate)
2 Branch bar (or Branch plate)
3 Sensor unit
4 Charging unit cover
5 Display unit
11 Secondary coil
21 Sensor unit
30 Resistance switching unit (Resistive circuit)
33 Optimum sense load resistance calculation circuit (Resistive circuit)
34, 134 Storage unit
135 Comparison unit
136 Specifying unit
137 Warning lamp (Indication unit)
B Branch breaker
CT Current sensor (Coil unit)
Rn Resistance
X1, X2, . . . , X6 Display
100 Distribution board
140 Remote control device

The invention claimed is:
1. A distribution board comprising:
a main bar that is connected to a power supply line;
a branch bar that is branched from the main bar, the branch bar supplying power to a load;
a breaker that is electrically connected to the branch bar, the breaker being configured to be electrically connected to the load, the breaker limiting to a predetermined set value a current to be supplied to the load; and
a display unit that is provided to the branched bar or the breaker, the display unit indicating a designation of the load that is planned to be connected to the breaker.

2. A distribution board comprising:
a main bar that is connected to a power supply line;
a branch bar that is branched from the main bar, the branch bar supplying power to a load;
a breaker that is electrically connected to the branch bar, the breaker being configured to be electrically connected to the load, the breaker limiting to a predetermined set value a current to be supplied to the load;
a display unit that is provided to the branched bar or the breaker, the display unit having a display for specifying the load that is planned to be connected to the breaker; and
a sensor unit that measures current supplied from the main bar to the load, wherein the sensor unit includes:
a sensor element that is installed on part of a wire supplying power from the main bar to the load, the sensor element emitting a signal corresponding to magnitude of current in the wire;
a storage unit that stores identification information for specifying the sensor element and operating characteristics information indicating operating characteristics of the sensor element; and
an output unit that is electrically connected with the sensor element and the storage unit, the output unit outputting a power consumption pattern of the load based on the signal from the sensor element, the identification information, and the operating characteristics information.

3. The distribution board according to claim 2,
wherein the storage unit stores in advance an assumed power consumption pattern indicating a power consumption pattern assumed when the load connected to the wire is being operated, and
the sensor unit further includes:
a comparison unit that compares the assumed power consumption pattern stored in the storage unit and an actual measurement value of the power consumption pattern based on the signal; and
a warning unit that references a comparison result by the comparison unit, the warning unit emitting a signal for attracting attention when the warning unit determines that the actual measurement value differs from the assumed power consumption pattern by greater than or equal to a predetermined discrepancy.

4. The distribution board according to claim 2, wherein the sensor unit further includes:
a pattern collection unit that collects an actual measurement value of a power consumption pattern when the load connected to the wire is being operated, the pattern collection unit obtaining a reference pattern based on the collected actual measurement value;
a comparison unit that compares the actual measurement value of the power consumption pattern based on the signal emitted from the sensor element after collection, with the reference pattern; and
a warning unit that references a comparison result by the comparison unit, the warning unit emitting a signal for attracting attention when the warning unit determines that the actual measurement value after the collection differs from the reference pattern by greater than or equal to a predetermined discrepancy.

5. The distribution board according to claim 3, further comprising:
a plurality of branch bars that include the branch bar;
a plurality of breakers that include the breaker; and
a plurality of sensor elements that include the sensor element,
wherein the sensor unit further includes:
a specifying unit that specifies a sensor element associated with the signal for attracting attention using the identification information; and
an indication unit that indicates to a user the sensor element specified by the specifying unit, or the branch bar or the breaker corresponding to the specified sensor element.

6. A method for manufacturing a distribution board, the method comprising:
providing a distribution board comprising:
a main bar that is connected to a power supply line;
a branch bar that is branched from the main bar, the branch bar supplying power to a load;
a breaker that is electrically connected to the branch bar, the breaker being configured to be electrically connected to the load, the breaker limiting to a predetermined set value a current to be supplied to the load;
a display unit that is provided to the branched bar or the breaker, the display unit having a display for specifying the load that is planned to be connected to the breaker; and
a sensor unit that measures current supplied from the main bar to the load, wherein the sensor unit includes:
a sensor element that is installed on part of a wire supplying power from the main bar to the load, the sensor element emitting a signal corresponding to magnitude of current in the wire;
a storage unit that stores identification information for specifying the sensor element and operating characteristics information indicating operating characteristics of the sensor element; and
an output unit that is electrically connected with the sensor element and the storage unit, the output unit outputting a power consumption pattern of the load based on the signal from the sensor element, the identification information, and the operating characteristics information;
providing to the breaker, a display for specifying the load that is planned to be connected to the breaker; and
connecting the load specified by the display to the breaker after the main bar, the branch bar, the breaker, and the sensor unit are assembled.

7. A power consumption managing system comprising:
the distribution board according to claim 2; and
a control device that is electrically connected to the output unit,
wherein the control device includes:
a data base that stores the loads and the identification information with they being corresponding to each other; and
a monitor unit that receives the power consumption pattern of the load output by the output unit, the identification information, and the operating characteristics information, the monitor unit referencing the data base after the reception, the monitor unit monitoring the power consumption pattern of the load connected to the distribution board.

8. The power consumption managing system according to claim 7, wherein the control device includes a power supply control unit that outputs a control signal to the breaker to control power supply, and the breaker changes starting and stopping of current supply to the load based on the control signal.

9. The method for manufacturing according to claim 6, further comprising:

providing a control device that is electrically connected to the output unit, wherein the control device includes:

a data base that stores the loads and the identification information with they being corresponding to each other; and a monitor unit that receives the power consumption pattern of the load output by the output unit, the identification information, and the operating characteristics information, the monitor unit referencing the data base after the reception, the monitor unit monitoring the power consumption pattern of the load connected to the distribution board.

* * * * *